July 30, 1957  F. H. MUELLER ET AL  2,800,812
SHELL CUTTER ASSEMBLY
Filed June 14, 1955.  4 Sheets-Sheet 1

INVENTORS:
Frank H. Mueller,
John J. Smith,
BY Cushman, Darby & Cushman
ATTORNEYS.

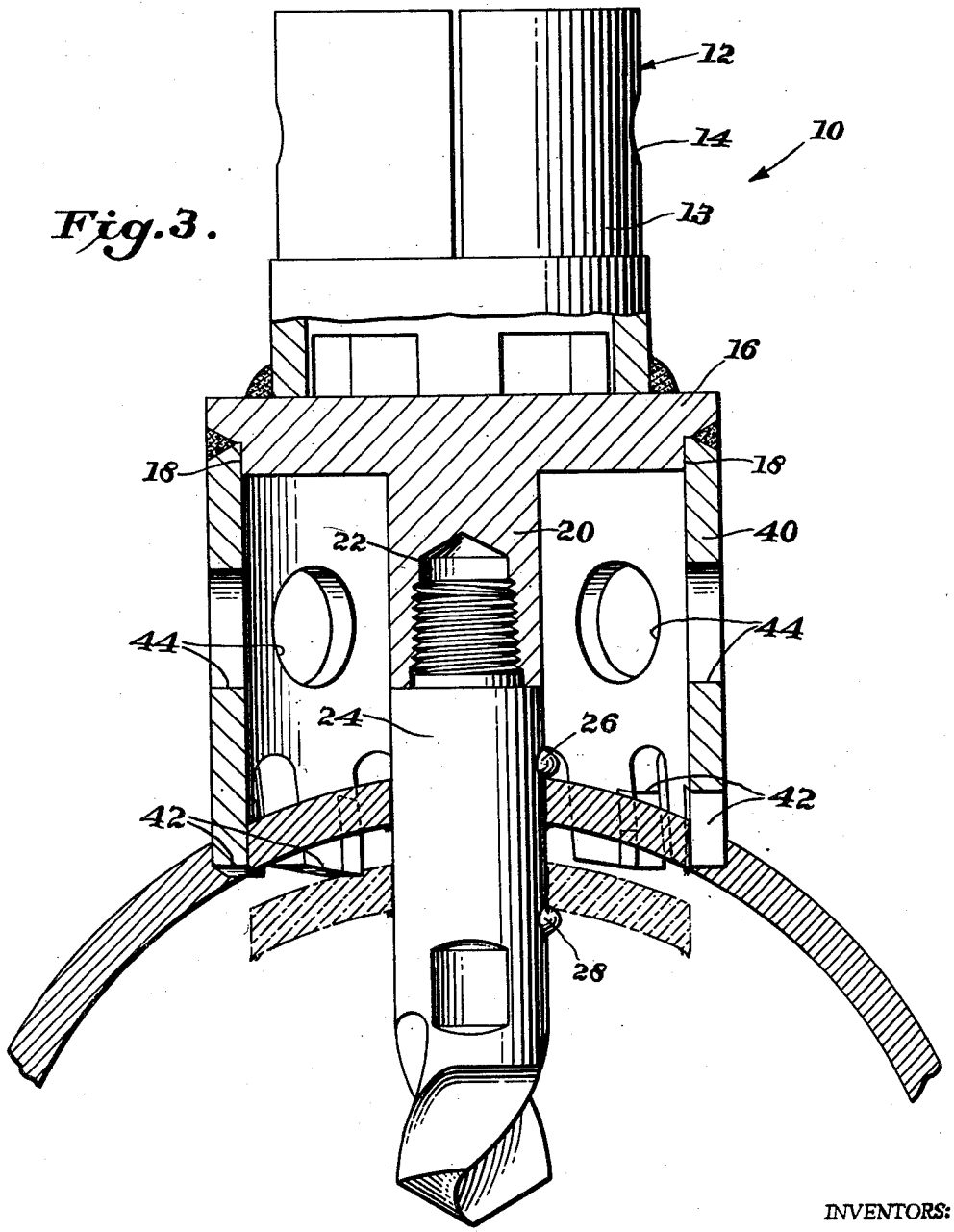

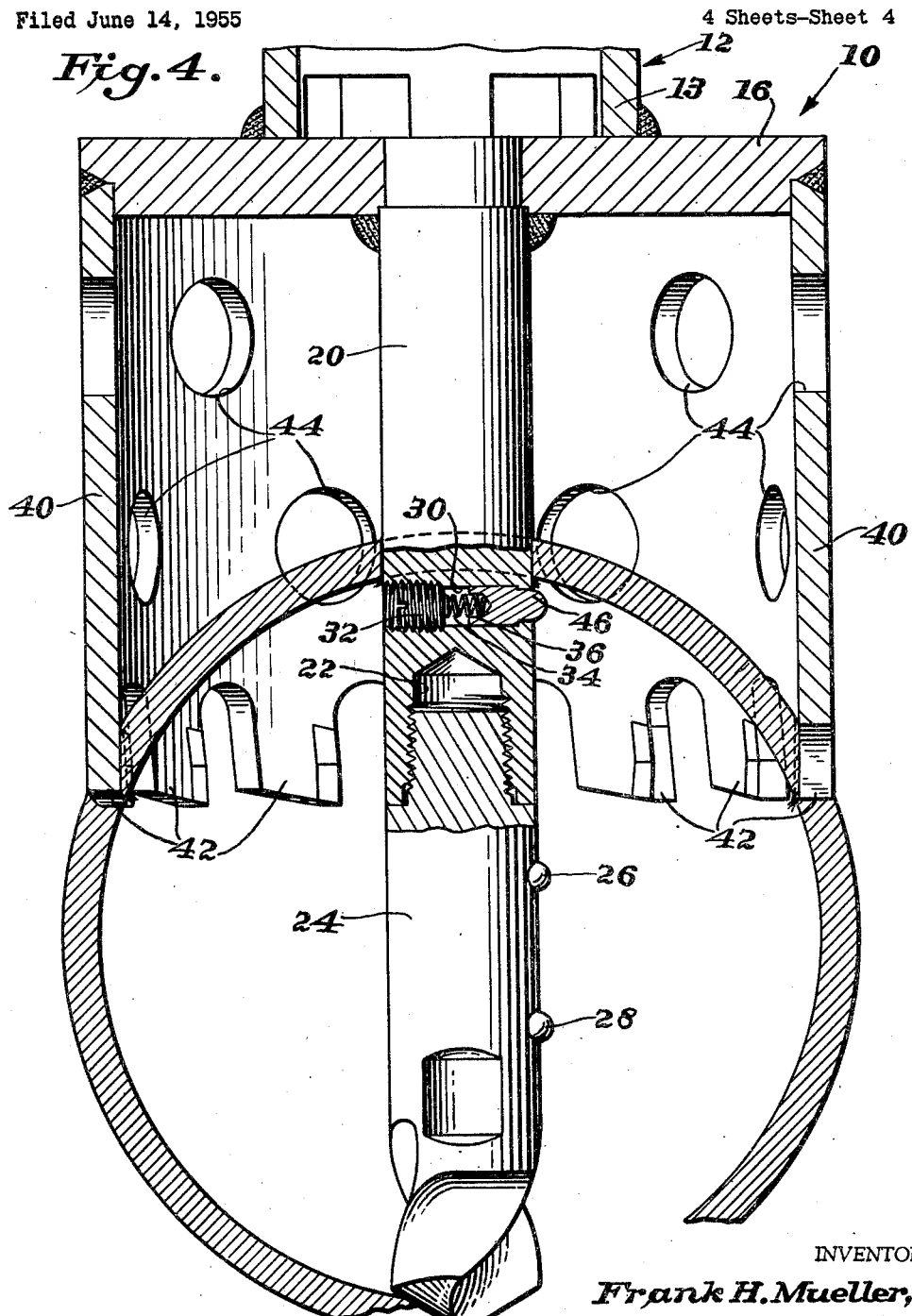

United States Patent Office 2,800,812
Patented July 30, 1957

2,800,812

SHELL CUTTER ASSEMBLY

Frank H. Mueller and John J. Smith, Decatur, Ill., assignors to Mueller & Co., Decatur, Ill., a corporation of Illinois Application June 14, 1955, Serial No. 515,282

5 Claims. (Cl. 77—69)

This invention relates to cutting tools and more particularly to improvements in the pilot drill of a shell cutter assembly operable to make lateral openings in conduits or pipes.

The invention concerns improvements in shell cutter assemblies for use with drilling machines of the type disclosed in Larry et al. Patent No. 2,188,607. Such a machine may be utilized to cut lateral openings in conduits or pipes for many purposes. For example, the Larry et al. patent mentioned above discloses a method of making lateral extensions from a conduit wherein the conduit cutting step may be performed by a drilling machine of the type described. Another example of the use of such a drilling machine is in providing a conduit with a line stopper fitting of the type disclosed in Larry Patent No. 2,108,068. In accomplishing both of these purposes, the cutting tool assembly of the drilling machine is operable to cut a lateral opening completely through both sides of the conduit, which opening has a diameter slightly less than the external diameter of the conduit. To perform this cutting function, the tool assembly generally includes a hollow cylindrical shell cutter and a concentric pilot drill for guiding the same.

This shell cutter in cutting the conduit removes two plugs or coupons from the conduit wall and means is provided on the pilot drill for retaining these coupons thereon so that they may be removed from within the conduit. This means may take the form of a threaded shoulder or a detent on the pilot drill which is retractable to pass through the hole drilled by the pilot drill and then extendable radially outwardly to engage beneath the coupon. Such coupon-retaining means has not proven entirely satisfactory where two coupons are to be removed, since the position of the retaining means has heretofore been such as to prevent only the lower coupon from falling. Stated differently, by preventing the lower coupon from falling, the upper coupon is also prevented from falling. The latter coupon, however, is cut first and because of the position of the retaining means, is free to fall a considerable extent before the second coupon is cut. This condition gives rise to certain disadvantages, namely, the first coupon may interfere with the subsequent cutting of the second coupon and can, in fact, jam the entire operation.

It will also be understood that a machine such as disclosed in the aforesaid Larry et al. patent may also be utilized to cut a single opening in a conduit having a diameter substantially greater than the diameter of the shell cutter and consequently, in order to enable the cutter to perform this function as well, the retaining means has heretofore been positioned on the pilot drill below the cutting edge of the shell cutter.

Accordingly, it is an object of the present invention to provide a cutting tool assembly for cutting lateral apertures or openings in a pipe which includes improved means for retaining the pipe coupons on the pilot drill so as to substantially overcome the disadvantages noted above.

A further object of the present invention is the provision of a cutting tool assembly having spaced means on the pilot drill operable alternatively to retain both the upper and lower coupons individually or merely a single coupon depending upon the desired operation.

A still further object of the present invention is the provision of a novel pilot drill bit having improved coupon retaining means thereon, which pilot drill bit may be utilized in shell cutter assemblies of various sizes.

A still further object of the present invention is the provision of an improved shell cutter assembly which is simple in construction, easy to operate and economical to manufacture.

These and other objects of the present invention will become more apparent during the course of the following detailed description and appended claims.

The invention may best be understood with reference to the accompanying drawings wherein an illustrative embodiment is shown.

In the drawings:

Figure 3 is a view similar to Figure 1 showing the shell cutter assembly in operative position with respect to a larger diameter pipe with a single coupon being cut; and Figure 4 is a view similar to Figure 1 showing a larger shell cutter assembly incorporating the pilot drill bit of the assembly shown in Figures 1-3.

Figure 1:
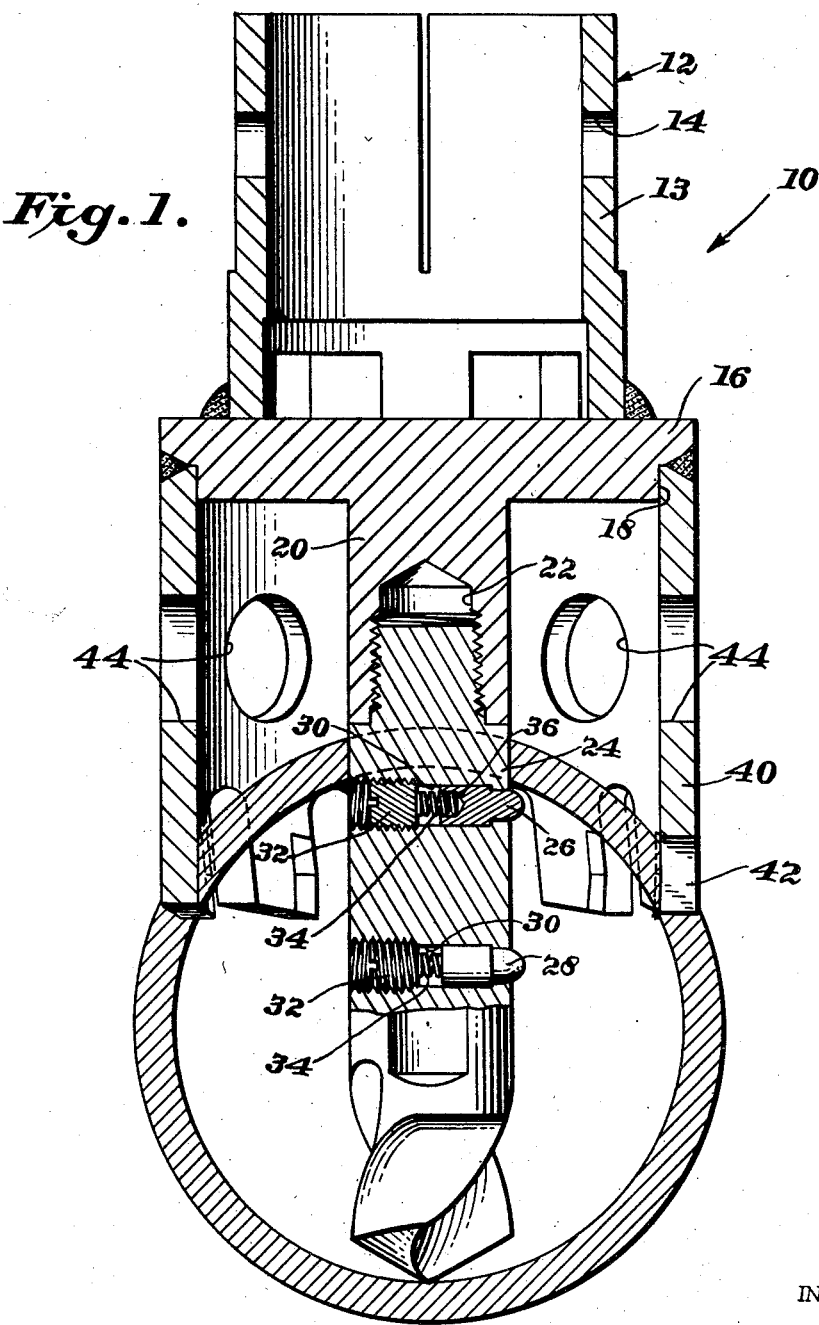
Figure 1 is a vertical sectional view of a shell cutter assembly embodying the principles of the present invention and showing the same in operative position with respect to a conduit after the first coupon thereof has been cut.

As noted above, the cutting tool assembly of the present invention is adapted to be used with a drilling machine of the type disclosed in the Larry et al. Patent No. 2,188,607. Accordingly, there is shown in the drawings, a shell cutter assembly, generally indicated at 10, which may be suitably connected to the boring bar (not shown) of a drilling machine in a conventional manner. The assembly includes a hub 12 having a socketed portion 13 provided with a pair of radially extending aligned apertures 14 through which a connecting pin (not shown) is adapted to extend so as to secure the assembly to the boring bar of the machine.

The hub 12 also includes a circular plate portion 16 having its lower outer periphery grooved as at 18 and a pilot drill shaft or projection 20 depending from the central portion thereof. The lower end of the shaft 20 is provided with a threaded socket 22 to receive the upper end of a pilot drill bit, generally indicated at 24. The pilot drill bit 24 may be formed from a cylindrical rod and has its lower end fluted in the usual manner to provide drilling edges. In accordance with the present invention, coupon retaining means are provided on the pilot drill which preferably includes upper and lower portions operable to retain the upper and lower coupons cut in carrying out the operations mentioned above.

The coupon retaining means may take many forms, a preferred embodiment being shown in the drawings as including a pair of vertically-spaced spring pressed detents 26 and 28. Each of these detents includes a first portion having an outer hemispherically shaped surface and a second portion comprising an inner cylindrical body of a diameter slightly greater than the diameter of the hemispherical surface. Each detent is disposed within a bore 30 extending transversely through the pilot drill bit 24. One end of each bore 30 is reduced in diameter to receive the first portion of the detent so that the hemispherical surface thereof may extend outwardly of the periphery of the drill bit. The main portion of each bore has a diameter substantially equal to the cylindrical body of the detent and it will be noted that the shoulder formed between the reduced portion of the bore and the main portion thereof provides a stop which engages the shoulder formed on the detent between the first and second portions thereof. In this manner, the outward movement of the hemispherical surface of the detent is limited by the engagement of the shoulders. The opposite end of each bore 30 is threaded so as to receive a plug 32 which engages one end of a coil spring 34, the other end of which seats within an axial bore 36 formed in the free end of the second portion of the detent. It can thus be seen that spring 34 acts to urge the detent into an extended position outwardly of the periphery of the drill bit, but permits the same to be moved inwardly into a retracted position within the drill bit wherein the hemispherical surface is flush with the periphery thereof. The force of spring 34 may be varied by turning the threaded plug 32.

Extending downwardly from the outer periphery of the plate 16 is a shell cutter 40 having its upper end secured within the groove 18 as by welding or the like, and its lower end provided with a plurality of cutting teeth 42. The shell cutter 40 is preferably provided with a plurality of apertures 44 so that when the shell cutter passes through the conduit, there will be no interruption of the flow of fluid in accordance with the practices set forth in the aforesaid patents.

Referring now more particularly to Figure 1, the position of the detents on the pilot drill bit with respect to the lower end of the cutting teeth of the shell cutter 40 is of essential importance to the present invention. In the normal operation of the drilling machine in performing the methods set forth in the aforesaid patents, the outer diameter of the shell cutter is less than the outer diameter of the pipe to be cut, but greater than the inner diameter thereof. In addition, the inner diameter of the shell cutter will be less than the inner diameter of the pipe so that as the drilling operation proceeds, the first coupon will be cut from the pipe before the teeth reach the center of the pipe. As shown in Figure 1, the upper detent 26 is disposed so that as the shell cutter completes the cut of the upper coupon, the detent will be disposed just below the adjacent lowermost portion of the coupon. Preferably, the detent is disposed below the lowermost adjacent portion of the coupon a distance slightly greater than one-eight of an inch since, in practice, it has been found that the pilot drill may form a burr on the inner surface of the pipe as it passes therethrough and such burr may be as much as one-eight of an inch thick. The upper detent 26 thus presents an upper coupon engaging surface which is positioned so as to engage beneath the first coupon as the same is completely cut by the shell cutter. This coupon engaging surface of the upper detent serves to retain the cut coupon on the pilot drill bit and prevents the lower edge of the coupon from dropping below the lower end of the shell cutter. In this manner, the danger of jamming the subsequent cutting of the second coupon by the shell cutter is eliminated. Moreover, it will be noted that while the upper detent prevents the downward movement of the upper coupon, the same is free to be moved upwardly.

Figure 2:
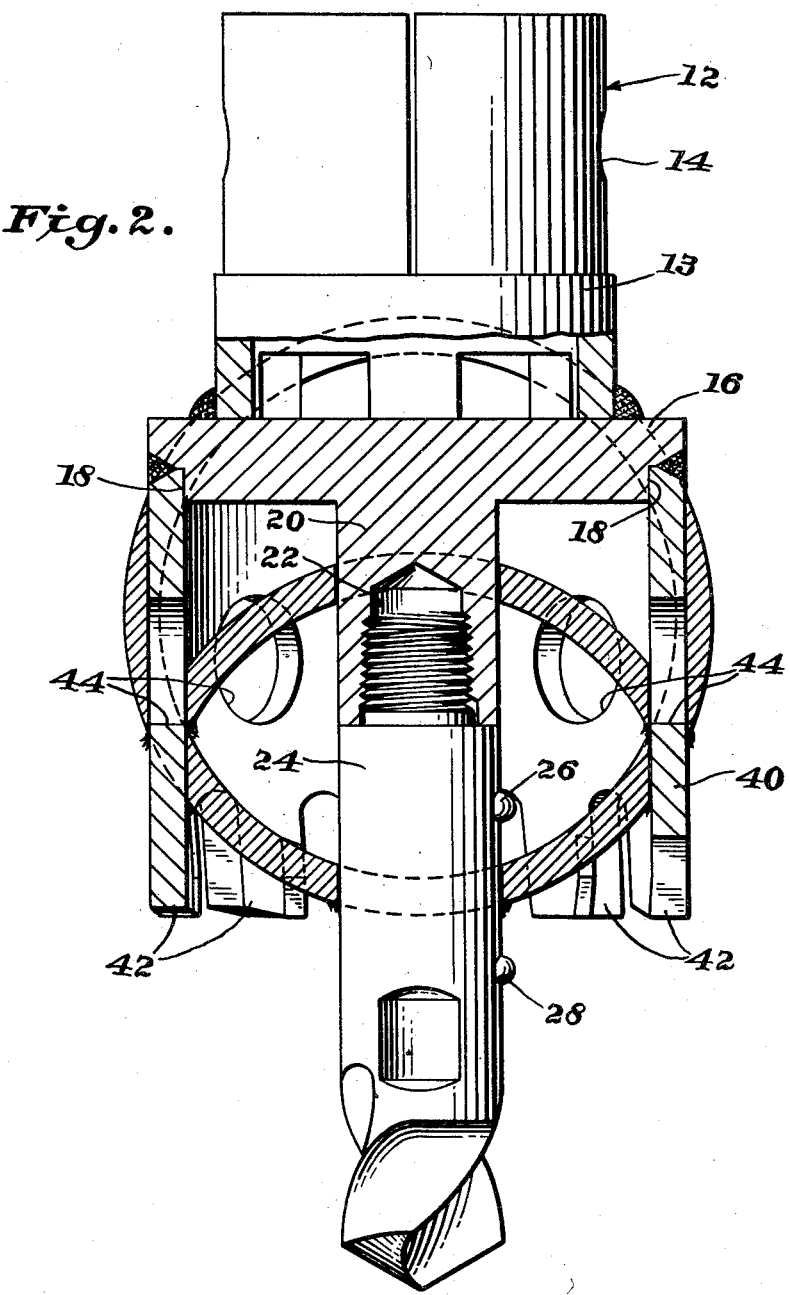
Figure 2 is a view similar to Figure 1 showing the condition of the shell cutter assembly just after the second coupon has been cut.

Referring now more particularly to Figure 2, it will be seen that as the drilling proceeds through the other side of the pipe, the second coupon will be cut by the shell cutter and the uppermost edges of the second coupon will then engage the lowermost edges of the first coupon thus moving the latter axially upwardly with respect to the pilot drill within the shell cutter. Figure 2 illustrates the condition of the drilling assembly at the completion of the cutting of the second coupon and it will be noted that the lower detent is disposed below the lowermost adjacent edge of the second coupon and below the edge of the shell cutter at least one-eighth of an inch. The lower detent is thus operative to retain the second coupon on the pilot drill and since the first coupon is in engagement with the second, both coupons will be retained on the pilot drill within the shell cutter.

The position of the detents as set forth above, insures that during the cutting of the first coupon, the same will be retained within the shell cutter so that the lower edges thereof are not permitted to drop down below the shell cutter teeth 42 as was heretofore possible. This arrangement eliminates any possibility of the first coupon turning and dropping down on the pilot drill so far that its lower edges may contact the bottom of the pipe. In that event if the cut coupon tends to be rotated by the pilot drill, the coupon rides up the side of the pipe and thus may become cocked on the shank of the pilot drill. Such action may possibly interfere with and jam the operation of cutting the second coupon.

Referring now more particularly to Figure 3, it will be seen that the drilling assembly of the present invention is also capable of retaining a single coupon which is to be cut from a pipe or conduit having a diameter substantially greater than the diameter of the shell cutter. When the drilling assembly is used in this manner, the lower detent 28 operates to retain the coupon on the pilot drill and since no further drilling is contemplated after the coupon is cut, this coupon may drop down on the pilot drill somewhat, as shown in phantom lines, without unfavorable results. It will be noted, however, that while the lower detent is sufficient in this operation, where two coupons are cut in the same operation, as shown in Figure 2, the mere provision of a single detent would not permit the first coupon to drop down upon the pilot drill a distance sufficient to enable the lower edges thereof to be disposed below the lower end of the shell cutter. With this condition, there is a strong likelihood that the cutter will become jammed by the coupon as mentioned above.

Referring now to Figure 4, there is shown a drilling assembly having a shell cutter of a diameter substantially greater than the diameter of the shell cutter previously described. This larger diameter shell cutter is adapted to drill a pipe or conduit of a larger diameter and may include a pilot drill shaft 20 which extends downwardly substantially to the lower end of the shell cutter. The pilot drill bit, such as described in Figures 1–3, may be utilized in this larger drilling assembly thereby enabling a single pilot drill bit to be interchangeably used with various size shell cutters. This relationship has the obvious advantage of reducing manufacturing costs, and provides greater convenience during operation. However, in order to adapt the larger shell cutter to the smaller size drill bit, it becomes necessary to provide an additional detent 46 in the shaft 20. This detent may be constructed in the same manner as the detents heretofore described. Here again, the upper detent 46 is positioned on the shaft so as to engage the lowermost adjacent edge of the upper coupon when making a line stopper cut. When the second coupon is cut, the upper detent 26 of the drill bit acts to retain the second coupon in much the same manner as the lower detent 28 functions as described in connection with Figure 2.

Because of the obvious necessity for providing shell cutters of different diameters for performing the aforesaid methods on pipes of different diameters, the optimum position of the coupon engaging surfaces of the detents cannot be expressed in terms of a set of physical dimensions which will be applicable to all. With respect to the position of the coupon engaging surface of the upper detent, the optimum position for all sizes is such that when making a line stopper cut, the upper detent will engage just beneath the adjacent lowermost portion of the upper coupon at the completion of the cut thereof. This position is dependent upon the diameter of the pilot drill, the internal diameter of the shell cutter and the thickness of the pipe to be cut. The internal diameter of the shell cutter and the thickness of the pipe to be cut determine at what position on the pipe the cut of the upper coupon will be completed. Consequently, the coupon engaging surface of the upper detent must be disposed on the pilot drill above the lower end of the shell cutter a distance less than the internal diameter of the shell cutter.

As to the position of the coupon engaging surface of the lower detent, here again the optimum condition is to have the same engage beneath the adjacent lowermost portion of the lower coupon at the completion of the cut thereof. Since this cut is completed when the lower end of the shell cutter reaches the lowermost point of the pipe as shown in Figure 2, the coupon engaging surface of the lower detent must be disposed on the pilot drill below the lower end of the shell cutter a distance greater than one-eighth of an inch to take care of a burr formation. The lower limiting position of the lower detent is determined by the length of the pilot drill extending below the lower end of the shell cutter. This length is limited by the physical requirements of the drilling machine with which the drilling assembly is used. For example, as set forth in the Larry et al. patent mentioned above, the drilling machine includes a valve past which the drilling assembly is moved to make the cut. When the cut is completed, the drilling assembly must be withdrawn past the valve sufficient to permit the same to be closed. The clearance between the lower end of the pilot drill and the valve is usually at a minimum so that if any portion of the removed coupon is disposed below the lower end of the pilot drill, it may interfere with the closing of the valve. Accordingly, the coupon engaging surface of the lower detent must be disposed on the pilot drill below the lower end of the shell cutter a distance less than that necessary to retain all portions of the coupon above the lower end of the pilot drill. This relationship is particularly important in considering the cutting of a single coupon as shown in Figure 3, since the single retained coupon will be concave downwardly rather than upwardly as is the case of the lower coupon when two coupons are cut.

It is to be understood that the forms of the invention herewith shown and described are to be taken as the preferred embodiments of the same and that various changes may be made without departing from the spirit of the invention or the scope of the appended claims.

We claim:

1. In a cutting tool assembly, a shell cutter adapted to cut aligned lateral openings in a conduit of slightly greater outside diameter than the outside diameter of said cutter by cutting upper and lower coupons therefrom, a pilot drill concentric with said shell cutter and extending below the lower end thereof, and means on said pilot drill for retaining thereon the coupons cut from said conduit, said means comprising a first portion extending outwardly from the periphery of said pilot drill below the lower end of said shell cutter, and a second portion extending outwardly from the periphery of said pilot drill above the lower end of said shell cutter, said second portion being operable to pass with the pilot drill through the upper coupon cut by said shell cutter and including an upper surface arranged to engage beneath the adjacent lowermost portion of the upper coupon as the cutting of the latter is completed so as to prevent downward movement of the upper coupon from within the shell cutter but to permit upward movement thereof occasioned by the engagement of the lower coupon therewith during the advance of said shell cutter to cut the lower coupon, said first portion being operable to pass with the pilot drill through the upper coupon and to retain the lower coupon on said pilot drill when the cutting of the lower coupon is completed by said shell cutter.

2. A cutting tool assembly as defined in claim 1 wherein said first and second portions comprise movable detents.

3. A cutting tool assembly comprising a hub having means thereon for connection with a drilling arbor, a shell cutter extending downwardly from the outer periphery of said hub, a concentric pilot drill extending downwardly from the central portion of said hub beyond the lower end of said shell cutter, and vertically spaced detents mounted on said pilot drill for movement between extended positions outwardly of the periphery of said pilot drill and retracted positions within said pilot drill, said detents in their extended positions presenting upper coupon retaining surfaces, the coupon retaining surface of the lower detent being disposed on said pilot drill below the lower end of said shell cutter and the coupon retaining surface of the upper detent being disposed on said pilot drill above the lower end of said shell cutter.

4. A cutting tool assembly as defined in claim 3 wherein the coupon retaining surface of the lower detent is disposed on said pilot drill below the lower end of said shell cutter a distance greater than ⅛ of an inch.

5. A cutting tool assembly as defined in claim 3 wherein the coupon retaining surface of the upper detent is disposed on said pilot drill above the lower end of said shell cutter a distance less than the internal diameter of the shell cutter.

References Cited in the file of this patent

UNITED STATES PATENTS 2,601,434    Du Bois _____ June 24, 1952